US010773457B2

(12) United States Patent
Lopez et al.

(10) Patent No.: US 10,773,457 B2
(45) Date of Patent: Sep. 15, 2020

(54) DETECTING AIRBORNE PARTICLES (71) Applicant: HEWLETT-PACKARD DEVELOPMENT COMPANY, L.P., Houston, TX (US)

(72) Inventors: Miguel Angel Lopez, Vancouver, WA (US); Alejandro Manuel De Pena, Sant Cugat del Valles (ES); Ignacio Alejandre, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/562,256

(22) PCT Filed: Jul. 2, 2015

(86) PCT No.: PCT/US2015/039070
§ 371 (c)(1),
(2) Date: Sep. 27, 2017

(87) PCT Pub. No.: WO2017/003484
PCT Pub. Date: Jan. 5, 2017

(65) Prior Publication Data
US 2018/0104896 A1    Apr. 19, 2018

(51) Int. Cl.
*B29C 64/20* (2017.01)
*B29C 64/386* (2017.01)
(Continued)

(52) U.S. Cl.
CPC ............ *B29C 64/20* (2017.08); *B29C 64/268* (2017.08); *B29C 64/30* (2017.08); *B29C 64/386* (2017.08);
(Continued)

(58) Field of Classification Search
CPC ..... B29C 64/20; B29C 64/386; B29C 64/268; B29C 64/393; B29C 64/30; B29C 64/153;
(Continued)

(56) References Cited

U.S. PATENT DOCUMENTS

| 4,934,920 A | 6/1990 | Yamauchi |
| 5,923,922 A | 7/1999 | Ishida |
(Continued)

FOREIGN PATENT DOCUMENTS

| CN | 104669618 | 6/2015 |
| WO | WO-2009084991 | 7/2009 |
| WO | WO-2016119887 A1 | 8/2016 |

OTHER PUBLICATIONS

Zhang, "Precise Microminiature Turnmilling Complex Maching Technology", National Defense Industry Press—p. 255; Apr. 1, 2014; English Abstract.
(Continued)

*Primary Examiner* — Robert J Grun
(74) *Attorney, Agent, or Firm* — HP Inc. Patent Department (57) ABSTRACT

An airborne particle detector comprises a light source to emit a light beam through a target space adjacent to a heat source of a 3D printer, a detector to detect an amount of light of the light beam having passed through the target space, and a detection engine in communication with the light source and the detector to detect airborne particles in the target space using an amount of light detected by the detector.

20 Claims, 4 Drawing Sheets (51) Int. Cl.
  *B33Y 10/00* (2015.01)
  *B33Y 50/02* (2015.01)
  *B29C 64/30* (2017.01)
  *B29C 64/393* (2017.01)
  *B29C 64/268* (2017.01)
  *H04N 5/232* (2006.01)
  *B33Y 30/00* (2015.01)
  *B33Y 40/00* (2020.01)
  *B29C 64/153* (2017.01)
  *B22F 3/105* (2006.01)
  *B22F 3/00* (2006.01)

(52) U.S. Cl.
  CPC ............ *B29C 64/393* (2017.08); *B33Y 10/00* (2014.12); *B33Y 50/02* (2014.12); *H04N 5/23212* (2013.01); *B22F 3/008* (2013.01); *B22F 3/1055* (2013.01); *B22F 2003/1057* (2013.01); *B22F 2203/00* (2013.01); *B22F 2999/00* (2013.01); *B29C 64/153* (2017.08); *B33Y 30/00* (2014.12); *B33Y 40/00* (2014.12)

(58) Field of Classification Search
  CPC ......... B33Y 50/02; B33Y 10/00; B33Y 40/00; B33Y 30/00; B22F 2999/00; B22F 2003/1057; B22F 3/008; B22F 2203/00; B22F 3/1055
  See application file for complete search history.

(56) References Cited

U.S. PATENT DOCUMENTS

| | | |
|---|---|---|
| 6,007,318 A | 12/1999 | Russell |
| 6,813,533 B1 | 11/2004 | Semak |
| 2003/0235635 A1 | 12/2003 | Fong |
| 2008/0006334 A1 | 1/2008 | Davidson et al. |
| 2010/0140550 A1 | 6/2010 | Keller et al. |
| 2010/0151136 A1 | 6/2010 | Davidson et al. |
| 2010/0194574 A1 | 8/2010 | Monk et al. |
| 2014/0263209 A1 | 9/2014 | Burris et al. |
| 2015/0108687 A1 | 4/2015 | Snyder et al. |

OTHER PUBLICATIONS

"Cool Vendors in 3D Printing, 2013"; May 2, 2013; http://www.organovo.com/sites/default/files/cool_vendors_in_3d_printing%202013_250450%20(3).pdf.

DETECTING AIRBORNE PARTICLES

BACKGROUND

Additive manufacturing techniques, such as three-dimensional (3D) printing, enable objects to be generated on a layer-by-layer basis. 3D printing techniques may generate layers of an object by forming successive layers of a build material on a build platform, and selectively solidifying portions of each layer of the build material.

BRIEF DESCRIPTION OF THE DRAWINGS

The following detailed description references the drawings, wherein.

DETAILED DESCRIPTION

Some additive manufacturing systems generate three-dimensional objects through the solidification of portions of successive layers of build material, such as a powdered build material. The properties of generated objects may be dependent on the type of build material and the type of solidification mechanism used.

In some examples, solidification may be achieved using a fusing agent which binds and solidifies build material into a fusing matrix, which is a mixture of generally separate particles or masses of build material, such as powder, that are adhesively bound together by a fusing agent, similar to a glue. For example, 3D printers may utilize selective fusing of areas in a powder layer, where fusing agent has been selectively deposited over the layer of powder. Alternatively, fusing agents are selectively deposited to absorb more energy, causing those areas with fusing agents to coalesce and solidify.

In some examples, the fusing agent may be activated by heat, which may be provided by an energy source of the 3D printer. In some instances, the energy, which for example could be infrared, visible light, or microwaves, may be provided by heating lamps. However, challenges may arise when the energy source may potentially come into contact with printing powder. For example, powder clouds of certain densities may cause ignition of the powder and cause fires or explosion.

Examples disclosed herein provide for detectors for detecting airborne particles near sources of heat of a 3D printer. An example airborne particle detector may include a light source to emit a light beam through a target space adjacent to a heat source of a 3D printer, a detector to detect an amount of light of the light beam having passed through the target space, and a detection engine in communication with the light source and the detector to detect airborne particles in the target space using the amount of light detected by the detector. In some examples, the detection engine detects airborne particles in the target space by comparing the amount of light detected by the detector with a calibrated amount of light. In this manner, airborne particles like build material may be effectively and quickly detected.

Figure 1:
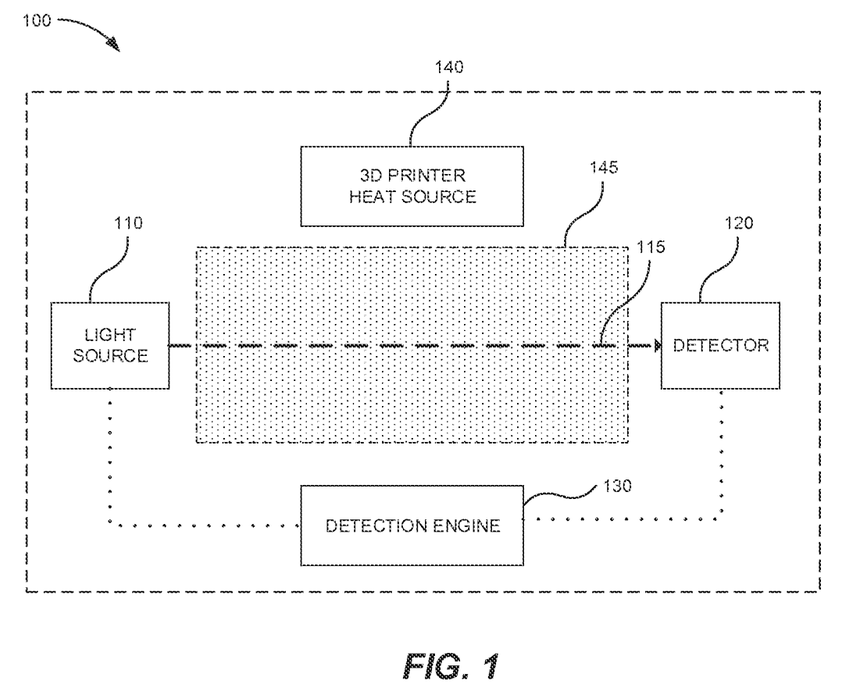
FIG. 1 is a block diagram of an example system for detecting airborne particles in a 3D printer.

Referring now to the figures, FIG. 1 is a block diagram of an example airborne particle detector 100. Airborne particle detector 100 may be a system, device, or combination of components and devices as indicated by the surrounding dotted box. Airborne particle detector 100 may be a part of a 3D printer or 3D printing system, or it may be a separate component that can be utilized for a 3D printer. In the example shown in FIG. 1, airborne particle detector 100 includes a light source 110, a detector 120, and a detection engine 130.

Light source 110 may be a device that emits a light beam 115, which may be a directional projection of electromagnetic radiation. In some examples, light source 110 may emit a visible light beam. In other examples, for examples, light source 110 may emit a laser beam. Light source 110 may generate light beam 115 or it may direct a generated light beam in a desired direction.

Light source 110 may emit light beam 115 through a target space 145 adjacent to a heat source 140 of a 3D printer. Heat source 140 may be a source of heat of a 3D printer. In some examples, heat source 140 may be a heating lamp of a 3D printer. For example, heat source 140 may be a halogen lamp. In some other examples, heat source may not necessarily generate heat but may be something that may get hot.

Target space 145 may be a particular volume of space that is adjacent to the heat source 140. Target space 145 may be the particular space where the presence of airborne particles could be heated by the heat source 140 to potentially risky levels. As described in detail herein, target space 145 may be the space between heat source 140 and the location of build materials.

Detector 120 may detect an amount of light of light beam 115 having passed through target space 145. Detector 120 may be a device that senses electromagnetic radiation and its intensity. For example, detector 120 may be a laser detector. Light beam 115 may be of a certain intensity when emitted by light source 110. Detector 120 may receive light beam 115 at the same or different intensity. If the received intensity is different, light beam 115 may have been affected on its path. For example, light beam 115 may have been scattered by airborne particles within target space 145.

Detection engine 130 may detect a quantity of airborne particles in target space 145 using the amount of light detected by detector 120. Detection engine 130 may generally represent a combination of hardware and programming. For example, the programming for detection engine 130 may be processor-executable instructions stored on a non-transitory machine-readable storage medium and the hardware for detection engine 130 may include a processor. In addition or as an alternative, detection engine 130 may include one or more hardware devices including electronic circuitry for implementing the functionality described.

Detection engine 130 may be in communication with light source 110 and detector 120 to detect the quantity of airborne particles in target space 145. For example, detection engine 130 may compare the amount of light detected by the detector with a calibrated amount of light. The calibrated amount of light may be an amount of light detected by detector 120 under calibration conditions, namely when there is no significant quantity of airborne particles in the target space 145.

Airborne particles as used herein may include printing powders, which may include particles of build material for use with 3D printers. In some examples, building materials may include polymers that may be thermally fused into layers of the 3D object to be printed. For example, build material may include polyamide 11 or 12.

In some examples, 3D printer 100 may take remedial actions in response to detection of a quantity of airborne particles by detection engine 130. For example, detection engine 130 may cause heat source 140 to be removed when the quantity of airborne particles reach above a threshold quantity or density. For example, when airborne particles are detected, detection engine 130 may cause heat source 140 to be turned off in order to prevent potential ignition or explosion caused by heating of the airborne particles. Turning off heat source 140 may mean shutting down a heat generating source or it may be taking other measures to lower the temperature of heat source 140.

In other examples, other remedial actions may be taken. For example, when powder is detected, air flow may be direct towards target space 145 to blow the airborne particles away from heat source 140. Additionally, or as an alternative, 3D printer 100 may suspend printing when airborne particles are detected so that additional airborne particles are not created. Furthermore, in some examples, 3D printer 100 may resume printing when levels of airborne particles falls below a threshold quantity or density.

Figure 2:
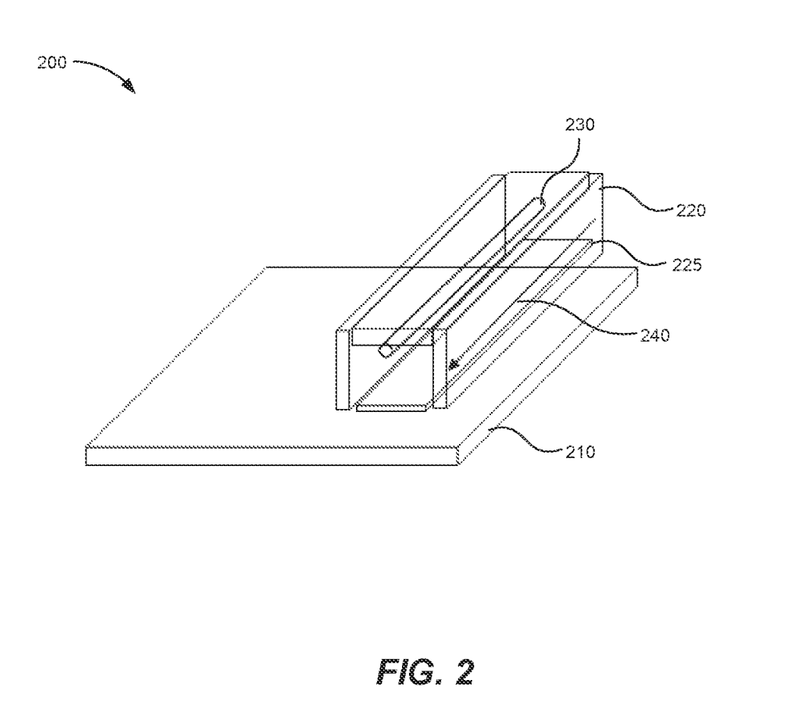
FIG. 2 is a schematic diagram of an example print area of an example 3D printer.

FIG. 2 is a schematic diagram of an example print area 200 of an example 3D printer. Print area 200 may include a powder platform 210 and a heating lamp 230. Powder platform 210 may hold a layer of build material, which may include printing powder which may be thermally fused by heating lamp 230. In some examples, the build material layer may have a thickness in the range of between about 20 to about 200 microns, or about 50 to about 300 microns, or about 90 to about 110 microns, or about 25 microns, or about 50 microns, or about 75 microns, or about 100 microns, or about 250 microns, although in other examples thinner or thicker layers of build material may be provided.

In some examples, powder platform 210 may be moveable in the z-axis such that as new layers of build material are deposited a predetermined gap is maintained between the surface of the most recently deposited layer of build material and other components of the 3D printer. In other examples, however, powder platform may not be movable in the z-axis, while other components may be movable in the z-axis.

Successive layers of the building material may be delivered to powder platform 210 by other components of the 3D printer, which may include, for example, a wiper blade and a roller. Build material may be supplied from a print bucket, hopper, or build material store. In some example, a layer of build material may be delivered to powder platform 210, whereas subsequent layers of build material will be deposited on a previously deposited layer of build material. Build material may be delivered via an apparatus or other system.

Furthermore, the build material may include other components, such as a fusing agent. For example, a fusing agent may be a printing fluid, such as an ink-type formulation comprising carbon black. In some examples the fusing agent may comprise a liquid carrier, such as water or any other suitable solvent or dispersant. According to one non-limiting example, a suitable fusing agent may be an ink-type formulation comprising carbon black, such as, for example, the ink formulation commercially known as CM997A available from Hewlett-Packard Company. In one example such an ink may additionally comprise an infra-red light absorber. In one example such an ink may additionally comprise a near infra-red light absorber. In one example such an ink may additionally comprise a visible light absorber. In one example such an ink may additionally comprise a UV light absorber. Examples of inks comprising visible light absorbers are dye based colored ink and pigment based colored ink, such as inks commercially known as CM993A and CE042A available from Hewlett-Packard Company. In some examples the fusing agent may comprise a liquid carrier, such as water or any other suitable solvent or dispersant.

Fusing agent may be selectively deposited on the powder layer by an apparatus such as printheads. Such apparatuses may also be mounted to mobile carriages that span the surface of powder platform 210.

Heating lamp 230 may provide the heat that may cause the build material to fuse. Heating lamp 230 may apply energy to the build material to cause solidification of portions of the build material according to where fusing agent has been delivered or has penetrated. In some examples, a portion of the build material having fusing agent may be curable to form a matrix in response to application of energy by heating lamp 230. In some examples, heating lamp 230 is an infra-red (IR) radiation source, near infra-red radiation source, visible light source, microwave energy source, ultraviolet (UV) radiation source, halogen radiation source, or a light emitting diode.

In some examples, heat may be applied in a substantially uniform manner to the whole surface of a layer of the build material. In most examples, however, heating lamp 230 may apply energy in a substantially uniform manner to a portion of the whole surface of a layer of build material. For example, heating lamp 230 may apply energy to a strip of the whole surface of a layer of build material. Accordingly, heating lamp 230 may be moved or scanned across the layer of build material such that a substantially equal amount of energy is ultimately applied across the whole surface of a layer of build material.

Accordingly, heating lamp 230 may be a fusing lamp housed in mobile carriage 220. Mobile carriage 230 may be a contained unit that may be a component of the 3D printer or it could be a separate entity. Mobile carriage 220 may scan across powder platform 210 to provide heat to fuse the build material. In some examples, mobile carriage may be able to move bi-directionally across the surface of powder platform 210. In other examples, mobile carriage 220 may be fixed, and powder platform may move relative to mobile carriage 220.

In other examples, mobile carriage 230 may not have a length that enables them to span the whole width of powder platform 210 but are additionally movable bi-directionally across the length of powder platform 210 in another axis. This configuration enables selective delivery of agents across the whole width and length of powder platform 210 using multiple passes. Other configurations, however, such as a page-wide array configuration, may also be used.

Heating lamp 230 may be enclosed within mobile carriage 220 to prevent exposing the heating lamp to foreign objects, such as airborne printing powder. For example as shown in FIG. 2, mobile carriage may have aluminum reflective walls on three sides that enclose heating lamp 230 and a fourth side 225 made of a transparent or other material that may allow the transfer of energy from heating lamp 230 to build material. For example, fourth side 225 may be made of protective glass.

During operation, heating lamp 230 may heat more than just the build material. For example, heating lamp 230 may cause mobile carriage 220 to be heated, particularly the glass fourth side 225 of carriage 220. Excessive heating of the glass may cause unintended fusing of the build material onto the glass. Accordingly, 3D printers with example print area 200 may have a cooling mechanism to stabilize the temperature of mobile carriage 220. For example, cooling airflow 240 may be driven through the chamber of mobile carriage 220.

In some examples, pressurized air may be used to drive airflow 240 through the mobile carriage 220. As a result, the interior chamber of mobile carriage 220 may be pressurized. If, for example, the glass of the fourth side 225 breaks, air may be rapidly released from the mobile carriage 220 as a result of the air pressure. As a result, the released air may agitate the powder on the powder platform 210, potentially creating clouds of powder that may encounter heating lamp 230.

In some other examples, clouds of powder may be created by other methods or events. For example, movement of carriage 220 and other components may cause air currents to agitate the powder. Furthermore, the powder delivery process itself may cause the formation of airborne powder clouds.

Figure 3:
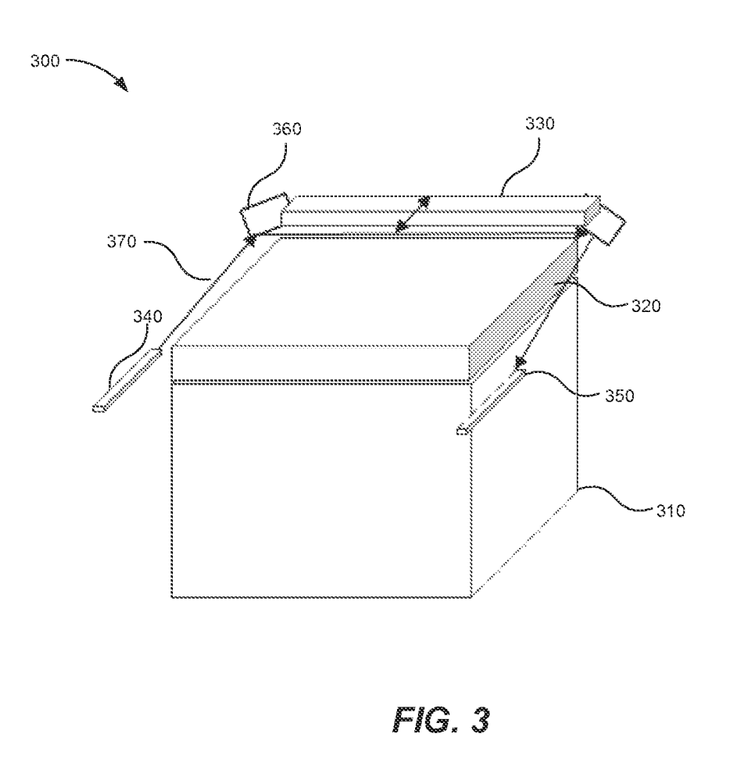
FIG. 3 is a schematic diagram of an example 3D printer with an example system for detecting airborne build material.

FIG. 3 is a schematic diagram of an example 3D printer 300 with an example system for detecting airborne printing powder. Printer 300 may include a powder storage 310, a powder platform 320, a mobile carriage 330, a light source 340, a detector 350, and reflectors 360.

Powder storage 310 may be a container that stores build material, such as printing powder. Build material may be delivered to powder platform 320 as described in examples related to FIG. 2. Mobile carriage 330 may be analogous to mobile carriage 230 and may house a fusing lamp. The fusing lamp may provide an energy to promote the fusing of the build material.

As described in relation to FIG. 2, the presence of airborne particles such as printing powder near the fusing lamp may cause undesirable heating of the particles that could lead to ignition and explosions. Accordingly, light source 340, detector 350, and reflectors 360 may form a system to detect airborne particles adjacent to the fusing lamp.

In the examples shown, light source 340 and detector 350 may be fixed, while reflectors 360 may be coupled to mobile carriage 330. Reflectors 360 may have a surface that is highly reflective, and may be coupled to mobile carriage 330 so that light 370 emitting from light source 340 is directed to detector 350. For example, as shown in FIG. 3, as mobile carriage is moved bi-directionally along the arrows shown, light 370 may continue to be reflected in the same direction towards detector 350. As a result, light 370 may continue to pass through the target space, which is shown here as the space between powder platform 320 and mobile carriage 330. In some examples, light 370 may be a laser beam emitted from light source 340.

In some examples, there may not be reflectors 360. For example, light source 340 and detector 350 may be coupled directly to mobile carriage 330 so that light 370 passes through the target space. Such implementations may call for more sophisticated or expensive components.

Furthermore, 3D printer 300 may include other components. For example, printer 300 may include an apparatus or components for delivering build material onto powder platform 320. Furthermore, in some examples, printer 300 may additionally comprise a pre-heater to maintain build material deposited on powder platform 320 within a predetermined temperature range. Use of a pre-heater may help reduce the amount of energy that has to be applied by the fusing lamp housed in mobile carriage 330 to cause fusion and subsequent solidification of build material on which fusing agent has been delivered or has penetrated.

Figure 4:
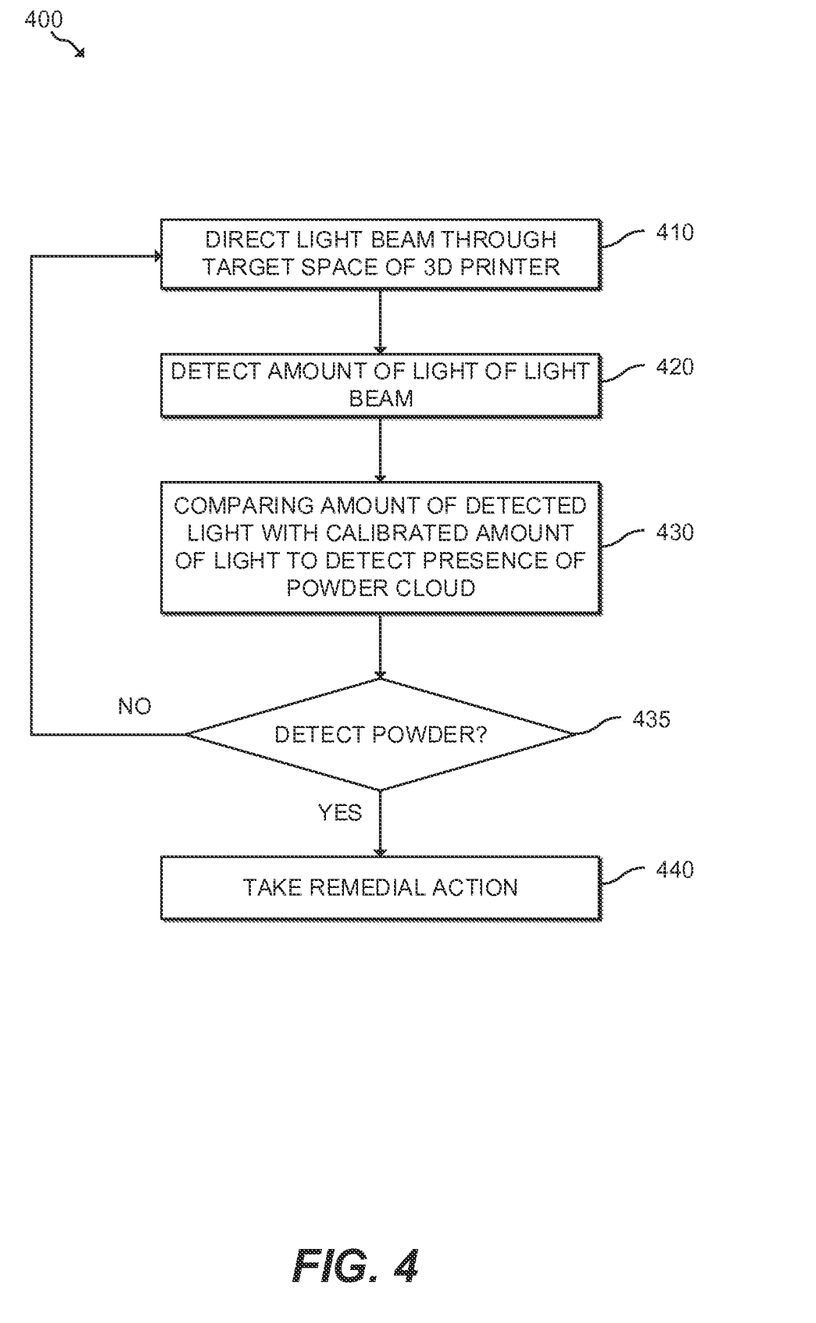
FIG. 4 is a flowchart of an example method for detecting powder cloud in 3D printers.

FIG. 4 is a flowchart of an example method 400 for detecting powder cloud in 3D printers. Aspects of the method may be computer implemented. In some examples, the orderings shown may be varied, some elements may occur simultaneously, some elements may be added, and/or some elements may be omitted. In describing FIG. 4, reference will be made to FIG. 1.

In an operation 410, a light beam may be directed through a target space adjacent to a heat source of a 3D printer. For example, light source 110 may emit a laser or other form of light 115 through target space 145 adjacent to heat source 140. In another example illustrated in FIG. 3, a laser beam or other light may be reflected through the target space so that the light source and detector may remain fixed.

In an operation 420, an amount of light generated by the light beam having passed through the target space may be detected. For example, detector 120 may detect light 115 emitted from light source 110 having passed through target space 145.

In an operation 430, the amount of light detected by the detector may be compared with a calibrated amount of light to detect presence of powder clouds. For example, light 115 from light source 110 passing through target space 145 may be deflected, absorbed, or otherwise affected by the presence of airborne particles, such as printing powder clouds, in the target space 145. As a result, the amount of light detected by detector 120 may be less than or different than the amount of light emitted from light source 110. Detection engine 130 may detect the presence of powder clouds by comparing the amount of light detected with a calibrated amount of light which may be the amount of light expected to pass through target space 145 without the effect of airborne particles.

In an operation 435, detection engine 130 may check whether there is the presence of powder clouds in the target space as determined by operation 430. If the quantity of powder clouds detected in the target space is below a threshold quantity, method 400 may return to operation 410 and continue to detect powder clouds. If the quantity is over the threshold quantity, method 400 may proceed to an operation 440.

In operation 440, remedial action may be taken to address the risk of powder ignition. For example, when a quantity of airborne particles over a threshold quantity is detected, detection engine 130 may cause heat source 140 to be turned off in order to prevent potential ignition or explosion caused by heating of the airborne particles. Turning off heat source 140 may mean shutting down a heat generating source or it may be taking other measures to lower the temperature of heat source 140. Furthermore, additional or alternative remedial measures may be taken when powder cloud is detected. For example, when powder is detected, air may be direct towards target space 145 to blow the powder cloud away from heat source 140. Additionally, or as an alternative, 3D printer 100 may suspend printing when powder cloud is detected so that additional powder cloud is not created.

In some examples, method 400 may proceed to operation 440 when a certain amount of powder cloud or more is detected. For example, powder cloud presence may be detected when the amount of light is below a certain light amount range as compared to the calibrated amount of light, such as when the amount of detected light drops below a certain light level. For example, method 400 may proceed from operation 435 to 440 when the detected light is less than half or some other percentage of the calibrated amount of light. In some examples, the light amount range that correlates to the detection of powder clouds may vary depending on a variety of factors, including the temperature of the heat source, the type of powder in the powder cloud, and the density of powder in the powder cloud.

All of the features disclosed in this specification (including any accompanying claims, abstract and drawings), and/or all of the elements of any method or process so disclosed, may be combined in any combination, except combinations where at least some of such features and/or elements are mutually exclusive.

In the foregoing description, numerous details are set forth to provide an understanding of the subject disclosed herein. However, examples may be practiced without some or all of these details. Other examples may include modifications and variations from the details discussed above. It is intended that the appended claims cover such modifications and variations.

As used herein, the singular forms "a," "an," and "the" mean "one or more." The terms "including" and "having" are intended to have the same inclusive meaning as the term "comprising."

What is claimed is:

1. A 3D printer, comprising:
    a build platform on which the 3D printer is configured to form successive layers of an object being formed;
    a heat source configured to direct heat to the build platform to support formation of the object;
    a light source configured to emit a light beam through a target space over the build platform, wherein the target space is heated by the heat source;
    a detector configured to detect an amount of light of the light beam having passed through the target space; and
    a detection engine in communication with the light source and the detector configured to detect a quantity of airborne particles in the target space using the amount of light detected by the detector and lower a temperature of the heat source in response to detection of the quantity of airborne particles in the target space.

2. The 3D printer of claim 1, wherein the detection engine detects the quantity of airborne particles in the target space by comparing the amount of light detected by the detector with a calibrated amount of light.

3. The 3D printer of claim 1, wherein the airborne particles comprise 3D printing build material.

4. The 3D printer of claim 1, wherein the light source and the detector are fixed relative to the heat source, and further comprising reflectors coupled to the heat source to direct the light beam through the target space.

5. The 3D printer of claim 1, wherein the detection engine causes the 3D printer to remove the heat source in response to airborne particles being detected.

6. The 3D printer of claim 1, wherein the detection engine causes the 3D printer to suspend printing in response to airborne particles being detected.

7. The 3D printer of claim 1, wherein the detection engine causes the 3D printer to direct air flow through the target space to eliminate airborne particles.

8. The 3D printer of claim 1, wherein the target space is a space immediately around the heat source in which operation of the heat source will ignite the airborne particles when the quantity of airborne particles exceeds a safe threshold quantity.

9. The 3D printer of claim 1, further comprising:
    a moveable powder platform that receives successive layers of a powdered build material; and
    a spreader to spread powdered build material on the powder platform to form the successive layers, wherein operation of the spread may cause some of the powdered build material to become the airborne particles.

10. The 3D printer of claim 1, wherein:
    the heat source is coupled to a movable carriage for moving the heat source with respect to a layer of build material;
    the light source and detector are stationary with respect to the movable carriage; and
    the movable carriage further comprises reflectors to direct light from the heat source to the detector through the target space, the target space moving with the heat source on the movable carriage.

11. The 3D printer of claim 1, wherein the heat source, light source and detector are all coupled to a moveable carriage.

12. A method for detecting powder cloud in the 3D printer of claim 1, comprising:
    with the light source, directing a light beam through the target space adjacent to the heat source of the 3D printer;
    with the detector, detecting an amount of light of the light beam having passed through the target space; and
    with the detection engine, comparing the amount of detected light with a calibrated amount of light to detect the presence of powder cloud.

13. The method of claim 12, further comprising causing the heat source to be removed in response to powder cloud being detected.

14. The method of claim 12, wherein the heat source is a fusing lamp housed in a mobile carriage.

15. A system for detecting airborne build material for 3D printers, comprising:
    a light source configured to emit a light beam through a target space between a build platform and a heating lamp of the 3D printer;
    a detector to configured detect an amount of light of the light beam having passed through the target space; and
    a detection engine in communication with the light source and the detector, the detection engine configured to detect a quantity of airborne build material in the target space using the amount of light detected by the detector and lower a temperature in the target space caused by the light source in response to detection of the quantity of airborne particles in the target space.

16. The system of claim 15, wherein the heating lamp is a fusing lamp housed in a mobile carriage.

17. The system of claim 15, wherein the light source and the detector are fixed relative to the mobile carriage, and further comprising reflectors coupled to the mobile carriage to direct the light beam through the target space.

18. The system of claim 15, wherein the detection engine detects airborne build material in the target space by comparing the amount of light detected by the detector with a calibrated amount of light.

19. The system of claim 15, wherein the detection engine causes the 3D printer to turn off the heating lamp in response to airborne build material being detected.

20. A 3D printer, comprising:
    a light source to emit a light beam through a target space adjacent to a heat source;
    a detector to detect an amount of light of the light beam having passed through the target space;
    a detection engine in communication with the light source and the detector, the detection engine configured to detect a quantity of airborne particles in the target space using the amount of light detected by the detector; and 
a blower to create an air flow into the target space to blow the airborne particles away from the heat source in response to the detection engine determining that the quantity of airborne particles in the target space exceeds a threshold.

* * * * *